(12) United States Patent
Jung et al.

(10) Patent No.: US 10,713,159 B2
(45) Date of Patent: Jul. 14, 2020

(54) SEMICONDUCTOR DEVICE FOR MANAGING WEAR LEVELING OPERATION OF A NONVOLATILE MEMORY DEVICE

(71) Applicants: SK hynix Inc., Icheon-si, Gyeonggi-do (KR); Seoul National University R&DB Foundation, Seoul (KR)

(72) Inventors: Hyunmin Jung, Hwaseong-si (KR); Sunwoong Kim, Changwon-si (KR); Hyokeun Lee, Seoul (KR); Woojae Shin, Seoul (KR); Hyuk-Jae Lee, Seongnam-si (KR)

(73) Assignees: SK hynix Inc., Icheon-si, Gyeonggi-do (KR); Seoul National University R&DB Foundation, Seoul (KR)

( * ) Notice: Subject to any disclaimer, the term of this patent is extended or adjusted under 35 U.S.C. 154(b) by 26 days.

(21) Appl. No.: 16/035,389

(22) Filed: Jul. 13, 2018

(65) Prior Publication Data
US 2019/0196956 A1 Jun. 27, 2019

(30) Foreign Application Priority Data
Dec. 22, 2017 (KR) .......................... 10-2017-0177683

(51) Int. Cl.
*G06F 12/02* (2006.01)
(52) U.S. Cl.
CPC .. *G06F 12/0246* (2013.01); *G06F 2212/7211* (2013.01)
(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 8,296,539 B2 * 10/2012 Chen ................... G06F 12/0246
                                                        711/103
9,032,137 B2 *  5/2015 Damle ................ G06F 12/0246
                                                        711/103
(Continued)

FOREIGN PATENT DOCUMENTS

KR        101596652  B1      2/2016

OTHER PUBLICATIONS

Jen-Wei Hsieh, Tei-Wei Kuo, and Li-Pin Chang. 2006. Efficient identification of hot data for flash memory storage systems. ACM Trans. Storage 2, 1 (Feb. 2006), 22-40. (Year: 2006).*

(Continued)

*Primary Examiner* — Daniel C. Chappell
(74) *Attorney, Agent, or Firm* — William Park & Associates Ltd.

(57) ABSTRACT

A semiconductor device may include a media controller configured to output an address in response to receiving a write request for writing to a nonvolatile memory. The semiconductor device may also include a hot address detector. The hot address detector is configured to store a list including the address output from the media controller and including meta data related to the address, to update the meta data according to the address output from the media controller, to determine whether the address output from the media controller is a hot address, and to adjust a length of the list.

16 Claims, 16 Drawing Sheets

(58) Field of Classification Search
CPC ..... G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–90; G06F 2212/00–7211; G06F 2213/00–4004; G06F 2216/00–17; G06F 2221/00–2153; G11C 11/00–5692; G11C 13/00–06; G11C 15/00–06; G11C 16/00–3495; G11C 17/00–18; G11C 2216/00–30

See application file for complete search history.

(56) References Cited

U.S. PATENT DOCUMENTS

| | | | | |
|---|---|---|---|---|
| 9,129,672 | B2* | 9/2015 | Moon | G11C 11/4078 |
| 9,176,863 | B2* | 11/2015 | Seo | G06F 12/0246 |
| 9,230,689 | B2* | 1/2016 | Tuers | G11C 16/349 |
| 9,342,389 | B2* | 5/2016 | Tang | G06F 11/00 |
| 9,747,202 | B1* | 8/2017 | Shaharabany | G06F 12/0253 |
| 10,360,157 | B2* | 7/2019 | Kim | G06F 12/1009 |
| 2007/0103992 | A1* | 5/2007 | Sakui | G06F 12/0246 365/185.33 |
| 2008/0162796 | A1* | 7/2008 | Chang | G06F 12/0246 711/103 |
| 2009/0204765 | A1* | 8/2009 | Gupta | G06F 12/121 711/133 |
| 2010/0017555 | A1* | 1/2010 | Chang | G06F 12/0246 711/103 |
| 2011/0035548 | A1* | 2/2011 | Kimmel | G06F 3/061 711/114 |
| 2011/0060865 | A1* | 3/2011 | Warren | G06F 12/0246 711/103 |
| 2012/0317337 | A1* | 12/2012 | Johar | G06F 12/0246 711/103 |
| 2014/0143474 | A1* | 5/2014 | Damle | G06F 12/0246 711/103 |

OTHER PUBLICATIONS

Dongchul Park, Young Jin Nam, Biplob Debnath, David H. C. Du, Youngkyun Kim, and Youngchul Kim. 2013. An on-line hot data identification for flash-based storage using sampling mechanism. SIGAPP Appl. Comput. Rev. 13, 1 (Mar. 2013), 51-64. (Year: 2013).*

J. Yun, S. Lee and S. Yoo, "Dynamic Wear Leveling for Phase-Change Memories With Endurance Variations," in IEEE Transactions on Very Large Scale Integration (VLSI) Systems, vol. 23, No. 9, pp. 1604-1615, Sep. 2015. (Year: 2015).*

Y. Yao, M. Yan, X. Kong, X. Xu, W. Feng and X. Xu, "An Adaptive Read-Write Partitioning Flash Translation Layer Algorithm," in IEEE Access, vol. 7, pp. 179063-179073, 2019. (Year: 2019).*

Qureshi, Moinuddin K., et al. "Practical and Secure PCM Systems by Online Detection of Malicious Write Streams." High Performance Computer Architecture (HPCA), 2011 IEEE 17th International Symposium on. IEEE, 2011.

* cited by examiner

SEMICONDUCTOR DEVICE FOR MANAGING WEAR LEVELING OPERATION OF A NONVOLATILE MEMORY DEVICE

CROSS-REFERENCE TO RELATED APPLICATIONS

The present application claims priority under 35 U.S.C. § 119(a) to Korean Patent Application No. 10-2017-0177683, filed on Dec. 22, 2017, which is incorporated herein by reference in its entirety.

BACKGROUND

1. Technical Field

Various embodiments may generally relate to a semiconductor device for managing a wear leveling operation of a nonvolatile memory device by detecting a hot address in the nonvolatile memory device.

2. Related Art

Nonvolatile memories are generally limited in number of write operations due to physical and chemical properties of memory cells therein.

For example, a memory cell of a phase change random access memory (PCRAM) has a lifetime corresponding to about $10^7$ write operations.

If write requests are concentrated on a specific memory cell of the memory device, a lifetime of the entire memory device may be shortened due to the shortening of the lifetime of the specific memory cell.

A wear leveling operation can be performed to more uniformly distribute write operations for the memory device over the memory cells included in the memory device.

Conventionally, a method of changing a mapping relationship between a logical address and a physical address is performed at regular intervals to perform a wear leveling operation.

If a large number of write requests are concentrated on a specific physical address within a predetermined interval, then deterioration of the corresponding memory cell results.

SUMMARY

In accordance with the present teachings, a semiconductor device may include a media controller configured to output an address in response to receiving a write request for writing to a nonvolatile memory. The semiconductor device may also include a hot address detector. The hot address detector is configured to store a list including the address output from the media controller and including meta data related to the address, to update the meta data according to the address output from the media controller, to determine whether the address output from the media controller is a hot address, and to adjust a length of the list.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing exemplary embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
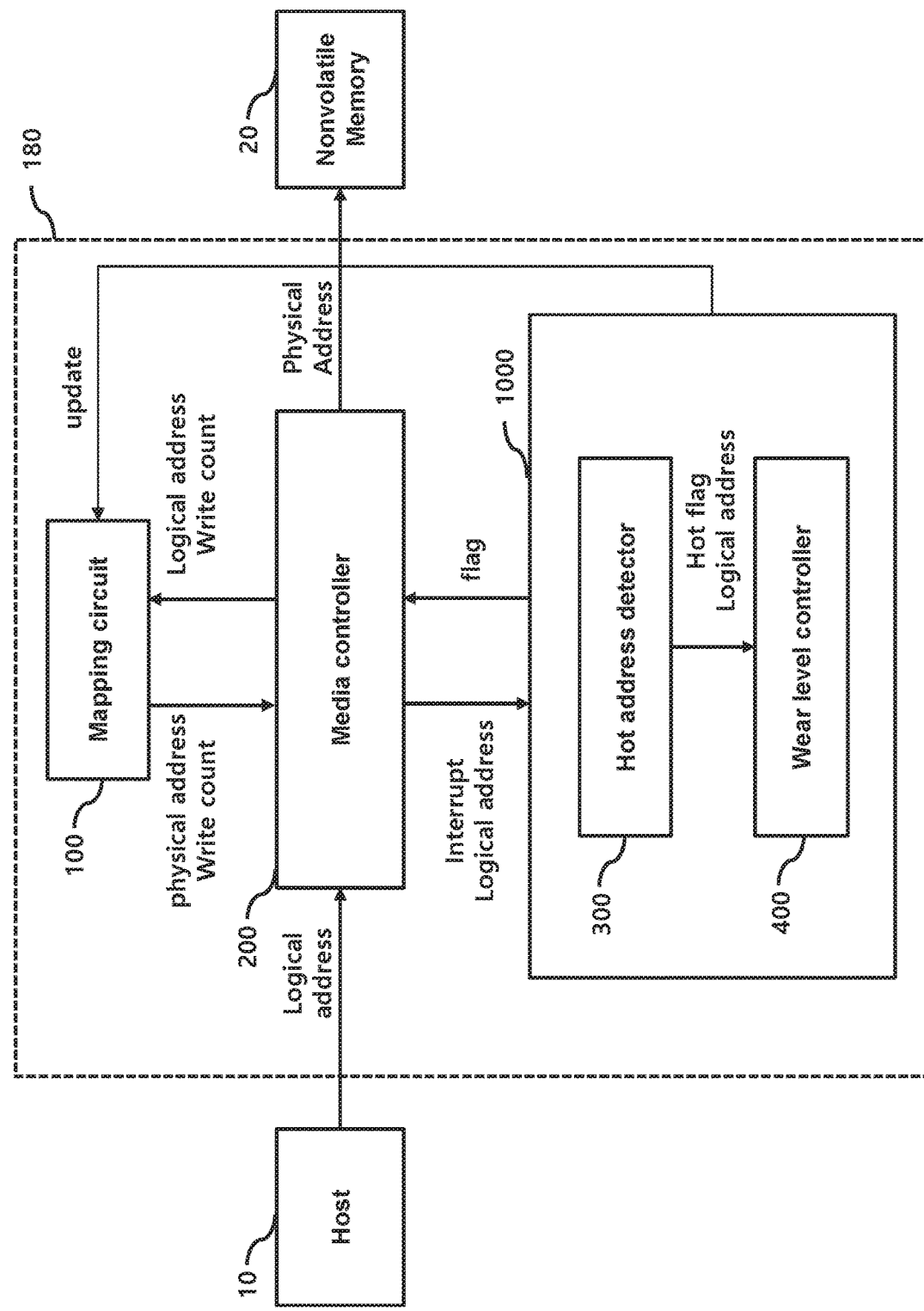
FIG. 1 shows a block diagram illustrating a semiconductor device according to an embodiment of the present disclosure.

FIG. 1 shows a block diagram illustrating a semiconductor device 180 according to an embodiment of the present disclosure.

The semiconductor device 180 includes a mapping circuit 100, a media controller 200, and a hot address detector 300.

The semiconductor device 180 may further include a wear level controller 400 for performing a wear leveling operation according to a hot address detected by the hot address detector 300.

The hot address detector 300 and the wear level controller 400 may be implemented in hardware, software, or a combination thereof, and may be included in a control module 1000.

The media controller 200 outputs a command and a physical address to a nonvolatile memory 20 corresponding to a request and a logical address received from a host 10.

In this embodiment, it is assumed that a write operation to the nonvolatile memory 20 is performed by a page.

The relationship between the logical address used in the host 10 and the corresponding physical address of the nonvolatile memory 20 is managed using a mapping table included in the mapping circuit 100.

The mapping circuit 100 may be implemented using a volatile memory, such as a DRAM.

The media controller 200 can also control a read/write operation to the mapping circuit 100.

The mapping circuit 100 stores a mapping table. The media controller 200 controls the mapping circuit 100 to determine whether a physical address corresponding to a logical address requested by the host 10 exists in the mapping table. If the physical address exists, the media controller 200 receives the physical address from the mapping circuit 100.

In addition to the mapping table, the mapping circuit 100 may also store information on a number of write operations or a write count performed on a corresponding physical address.

The media controller 200 can read a write count from the mapping circuit 100 and store a write count in the mapping circuit 100.

In the present embodiment, it is assumed that a write count is managed on the basis of a block address, where a block includes a plurality of pages.

Hereinafter, when managing a write count in the mapping circuit 100, it is assumed that a physical address indicates a physical block address and a logical address indicates a logical block address.

Regarding the operations of the hot address detector 300 and the wear level controller 400, it is assumed that a logical address and a physical address indicate a logical block address and a physical block address, respectively, unless otherwise specified.

The present teachings are not limited to this embodiment, and a person skilled in the art will be able to derive a technique for managing a write count by a page from the present disclosure.

The nonvolatile memory 20 may be a memory device, such as a flash memory device, a phase change memory device, or the like.

The media controller 200 may increase a write count corresponding to a physical address when a request from the host 10 is a write request, and the media controller 200 may store a write count in the mapping circuit 100.

The media controller 200 provides an interrupt signal to the control module 1000 when a write count becomes a multiple of a reference value (for example, 1024), and provides a corresponding logical address or a physical address.

In the present embodiment, it is assumed that the hot address detector 300 detects a hot address based on a logical address.

The scope of the present teachings is not limited to the hot address detector 300 detecting a hot address based on a logical address. In another embodiment, the hot address detector 300 detects a hot address based on a physical address.

In the present embodiment, it is assumed that the hot address detector 300 performs a hot address detecting operation when the media controller 200 detects that a current write count is a multiple of the reference value.

At such time, the media controller 200 may provide the hot address detector 300 with a logical address corresponding to the physical address whose write count is a multiple of the reference value. In this case, the media controller 200 may provide an interrupt signal to initiate an operation of the hot address detector 300.

In another embodiment, the hot address detector 300 may initiate a hot address detection operation based on a logical address each time a write request is input from the host 10. In this case, the media controller 200 might not provide an interrupt signal to the hot address detector 300.

Hereinafter, the present disclosure is described based on an embodiment in which the hot address detector 300 performs a hot address detecting operation according to an interrupt signal provided from the media controller 200.

Hereinafter, a hot address refers to a selected address on which to perform a wear leveling operation. Among different addresses, hot addresses are addresses to which write requests are concentrated.

As described above, in the present embodiment, the hot address detector 300 detects a hot address based on a logical block address.

When the hot address detector 300 detects a hot address, the hot address detector 300 provides a logical address determined as a hot address together with a hot flag signal to the wear level controller 400.

A specific configuration of the hot address detector 300 and a specific method for detecting a hot address is described in detail below.

The wear level controller 400 may control the mapping circuit 100 to perform a wear leveling operation upon receiving a hot address.

For example, the wear level controller 400 may update the mapping table of the mapping circuit 100 so that a logical address determined as a hot address is mapped to another physical address.

The wear level controller 400 may select an arbitrary physical address or select a physical address with a minimum write count.

The selected physical address may already be mapped to a logical address or may not be mapped to any logical address.

In the former case, the wear leveling operation may be performed by swapping the relationship between the physical addresses and the logical addresses in the mapping table. In the latter case, the wear leveling operation may be performed by inputting the selected physical address in the mapping table instead of the existing physical address.

When the wear level controller 400 finishes the wear leveling operation, it can output an end signal to the media controller 200.

If the hot address detector 300 does not detect a hot address, it can immediately output the end signal to the media controller 200 without performing the wear leveling operation.

Figure 2:
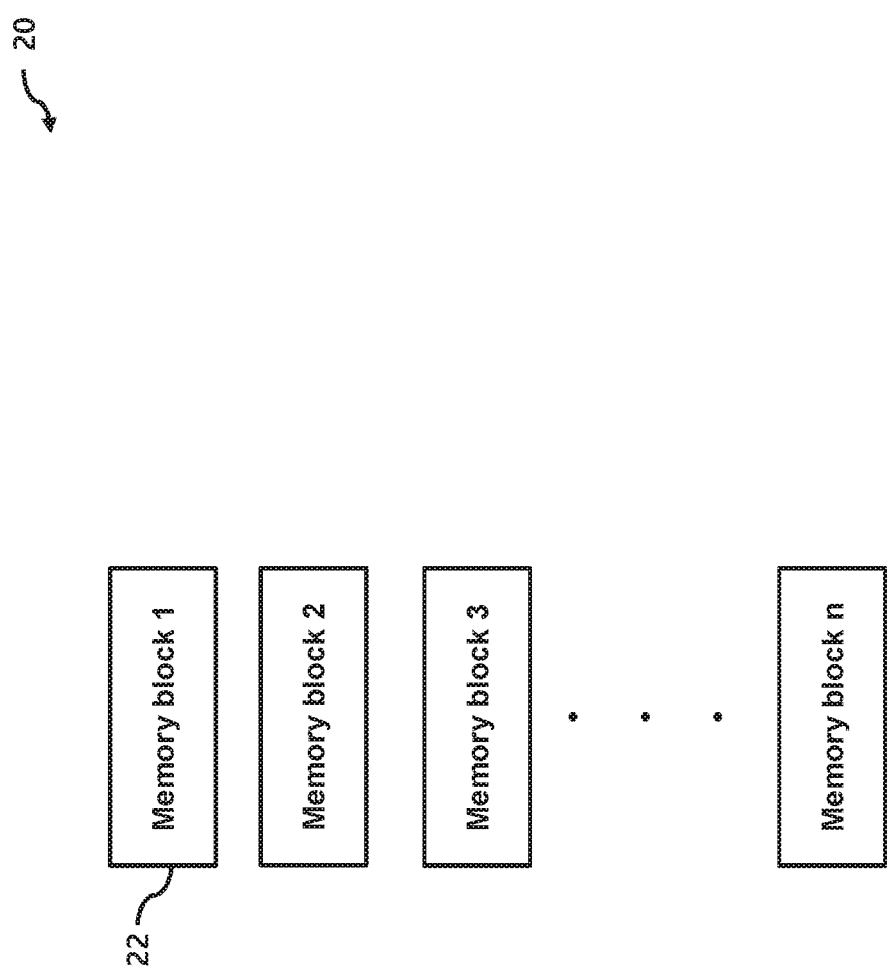
FIG. 2 shows a block diagram illustrating a nonvolatile memory device according to an embodiment of the present disclosure.

FIG. 2 shows a block diagram illustrating the nonvolatile memory 20 according to an embodiment of the present disclosure.

The nonvolatile memory 20 includes a plurality of memory blocks 22.

As described above, in this embodiment, each memory block 22 includes a plurality of pages, and a write operation to the nonvolatile memory 20 is performed by a page.

Figure 3:
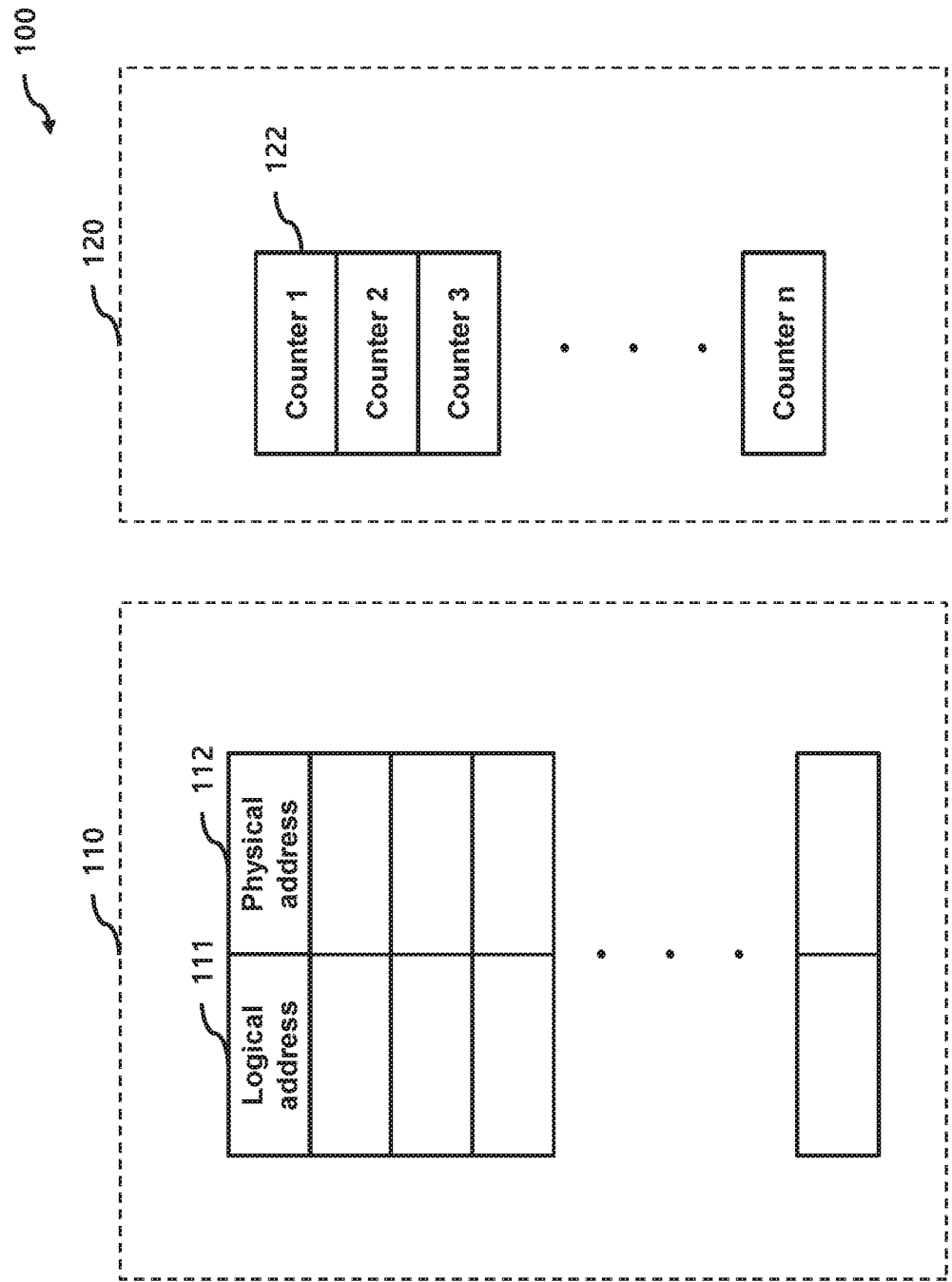
FIG. 3 shows a block diagram illustrating a mapping circuit according to an embodiment of the present disclosure.

FIG. 3 shows a block diagram illustrating the mapping circuit 100 according to an embodiment of the present disclosure.

The mapping circuit 100 includes a mapping table 110 and a counter array 120.

In this embodiment, the mapping circuit 100 includes the mapping table 110 and the counter array 120, but these might not be included on a common chip.

That is, the mapping table 110 and the counter array 120 may be disposed on separate chips.

The mapping table 110 includes a logical address field 111 and a physical address field 112.

In this embodiment, the logical address and the physical address stored in the mapping table 110 are page addresses.

The counter array 120 includes a plurality of counters 122.

In this embodiment, each counter 122 stores a write count corresponding to a physical block address.

In other words, in the present embodiment, each counter 122 corresponds to a memory block 22.

Accordingly, when a write operation is performed on any page included in a memory block 22, the write count of the corresponding counter 122 is updated.

The media controller 200 can determine a physical address corresponding to a logical address requested by the host 10 by referring to the mapping table 110.

When there is no physical address corresponding to a logical address of a write request, the media controller 200 can allocate a physical address of a blank page.

A write count corresponding to a logical address can be confirmed by referring to a physical address and the counter array 120.

The media controller 200 increases a write count of a counter 122 corresponding to a physical address.

Figure 4:
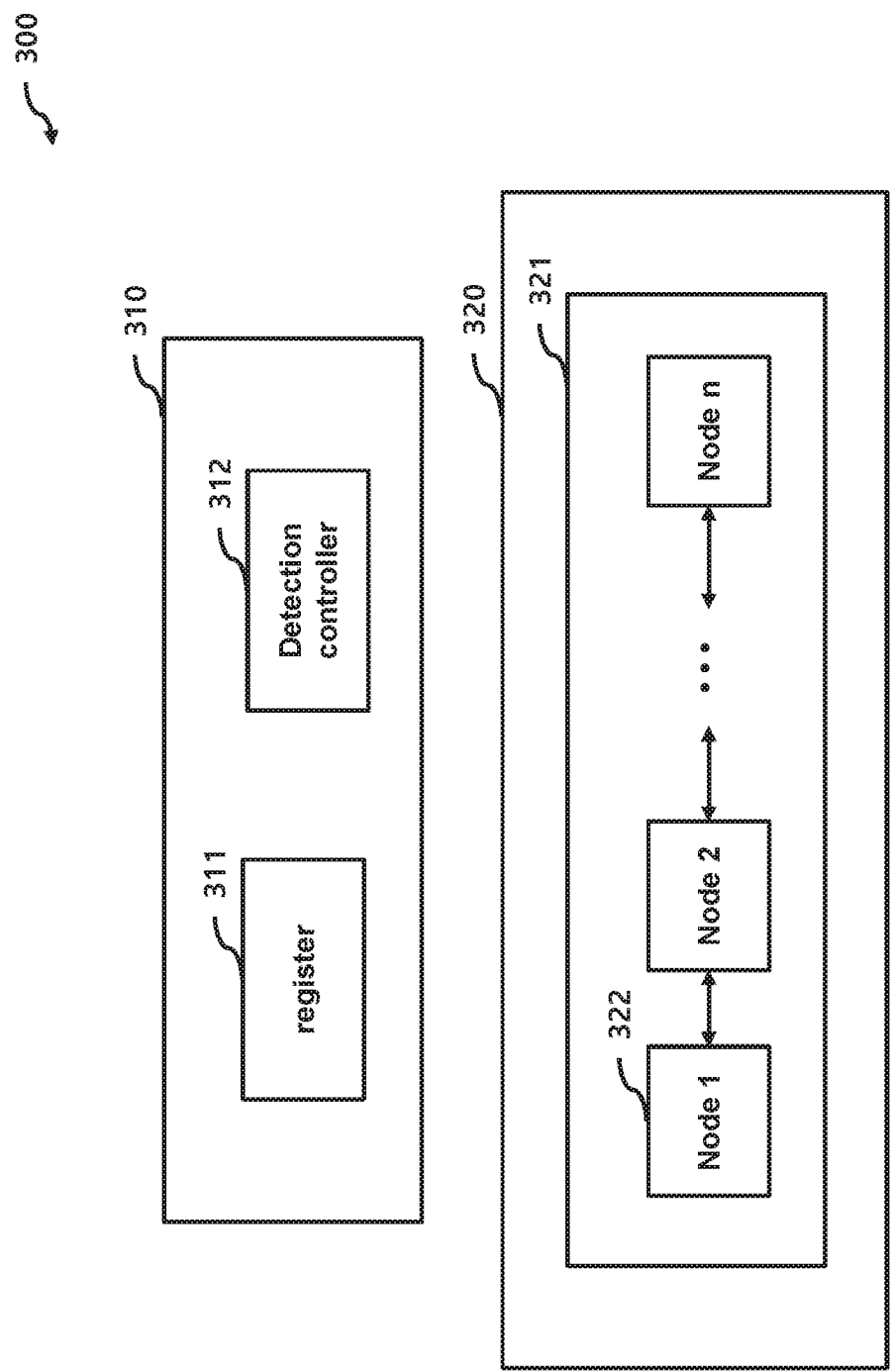
FIG. 4 shows a block diagram illustrating a hot address detector according to an embodiment of the present disclosure.

FIG. 4 shows a block diagram illustrating the hot address detector 300 according to an embodiment of the present disclosure.

The hot address detector 300 includes a detecting circuit 310 and a memory stack 320.

The detecting circuit 310 manages a logical address provided by the mapping circuit 100 using a memory stack 320 and detects a hot address therefrom.

The detecting circuit 310 includes a register 311 for storing variables and a detection controller 312 for controlling the memory stack 320 with reference to the register 311.

The memory stack 320 includes a double linked list 321 used to detect hot addresses.

Hereinafter, the double linked list 321 may be referred to as the list 321.

The detection controller 312 may variably adjust the length of the list 321.

Accordingly, some of the storage space of the memory stack 320 can be used for other purposes, thereby saving resources of a system.

The detection controller 312 controls the register 311 and the list 321 to detect a hot address.

The operation of the detection controller 312 is described in more detail below.

Figure 5:
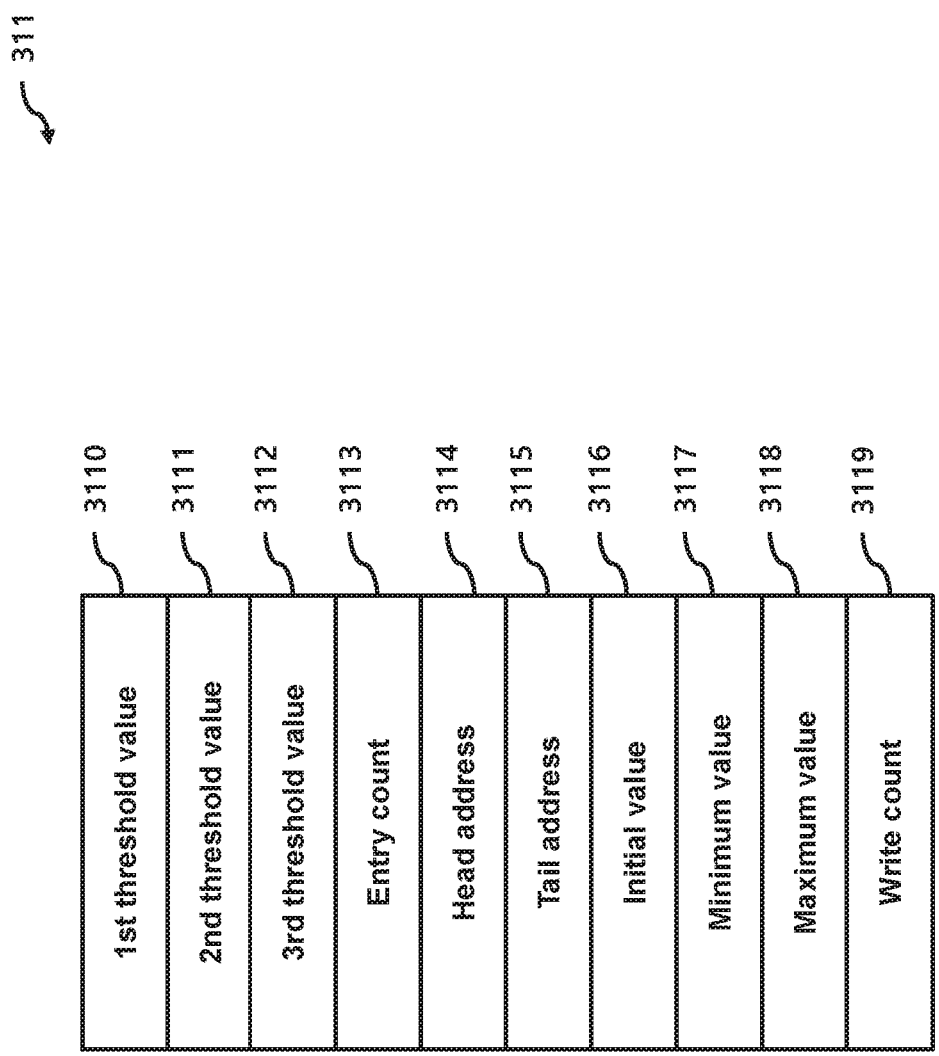
FIG. 5 shows a block diagram illustrating a data structure of a register according to an embodiment of the present disclosure.

FIG. 5 shows a block diagram illustrating a data structure of the register 311 according to an embodiment of the present disclosure.

The register 311 includes a first threshold value field 3110, a second threshold value field 3111, a third threshold value field 3112, an entry count field 3113, a head address field 3114, a tail address field 3115, an initial value field 3116, a minimum value field 3117, a maximum value field 3118, and a write count field 3119.

The first threshold value is a value that is compared with a hit count for a node, and a logical address of a node is determined as a hot address according to the comparison result.

Hereinafter, the first threshold value may be referred to as a hot threshold value.

The second threshold value is a value to be compared with a frequency count for a node, and a node is determined as a victim node according to the comparison result.

In this embodiment, a victim node means a node to be removed from the list 321.

Hereinafter, the second threshold value may be referred to as a victim threshold value.

The third threshold value is a value to be compared with a write count, and an operation for adjusting the second threshold value is performed according to the comparison result.

The entry count corresponds to a number of nodes 322 included in the list 321. The entry count corresponds to a length of the list 321

The head address indicates an address of a head node contained in the list 321.

The tail address indicates an address of a tail node included in the list 321.

The initial value represents an initial length of the list 321.

Accordingly, at the initial stage of an operation, the number of nodes in the list 321 increases until the initial value is reached.

The minimum value represents a minimum length of the list 321.

Accordingly, the length of the list 321 is managed to be greater than or equal to the minimum value.

The maximum value indicates a maximum length of the list 321.

Accordingly, if the number of nodes included in the list 321 is the maximum value, a victim node is selected and the victim node is evicted before adding a new node.

In this embodiment, a write count increases each time an interrupt signal is output from the media controller 200.

In an embodiment where the hot address detector 300 operates whenever a write request is received from the host 10 regardless of an interrupt signal from the media controller 200, a write count may be incremented each time a write operation is requested.

Figure 6:
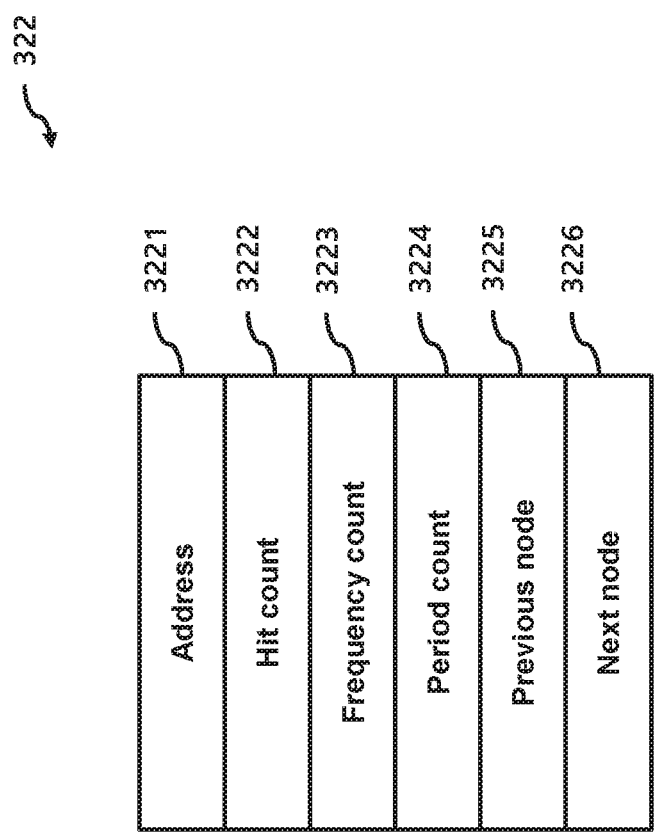
FIG. 6 shows a block diagram illustrating a data structure of a node according to an embodiment of the present disclosure.

FIG. 6 shows a block diagram illustrating a data structure of a node 322 according to an embodiment of the present disclosure.

Each node 322 includes an address field 3221, a hit count field 3222, a frequency count field 3223, a period count field 3224, a previous node field 3225, and a next node field 3226.

The address represents a logical address of a block managed by a current node.

The information other than an address may be collectively referred to as meta information or meta data corresponding to an address.

The hit count indicates a number of hits to a logical address managed by a current node.

In this embodiment, a hit represents a state where a node stores a logical address the same as a logical address provided from the media controller 200 along with an interrupt signal. A miss represents a state where a node does not store a logical address the same as a logical address provided from the media controller 200 along with an interrupt signal.

In an embodiment where the hot address detector 300 operates whenever a write request is provided from the host 10 regardless of an interrupt signal from the media controller 200, a hit represents a state where a node stores a logical address the same as a requested logical address.

The frequency count is incremented at a node where a hit occurs among nodes included in the list 321, and the frequency count is decremented at a node where a miss occurs among nodes included in the list 321.

The period count is incremented at a node where a hit occurs among nodes included in the list 321, and the period count remains constant for a node where a miss occurs.

The period count may be reset after adjusting the second threshold value.

The hot address detecting operation using the hit count, the frequency count, and the period count is specifically described below.

The previous node is an address of a node before the current node.

The next node is an address of a node after the current node.

Figure 7:
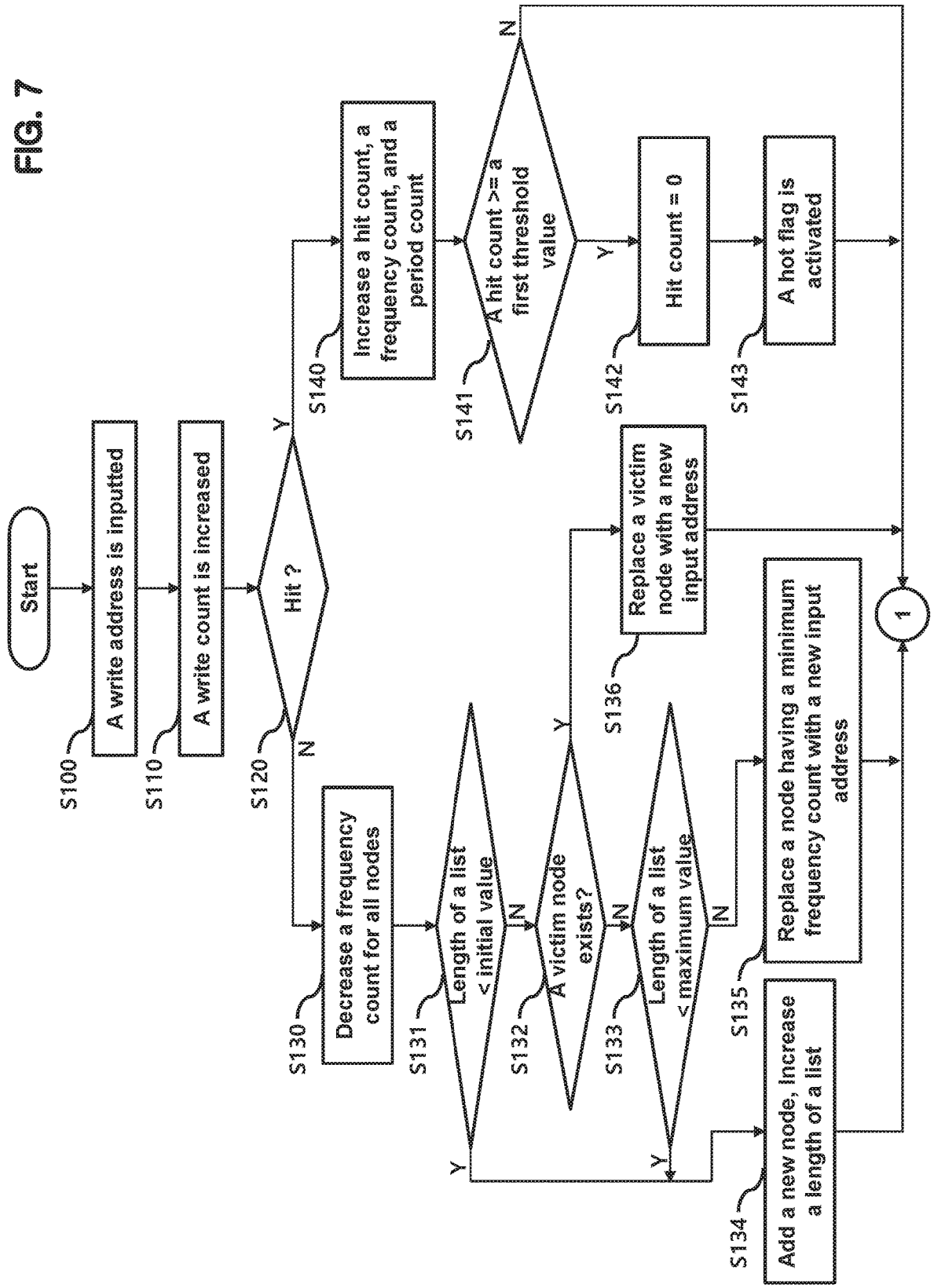
FIGS. 7 and 8 show a flow chart illustrating operations of a hot address detector according to an embodiment of the present disclosure.
Figure 8:
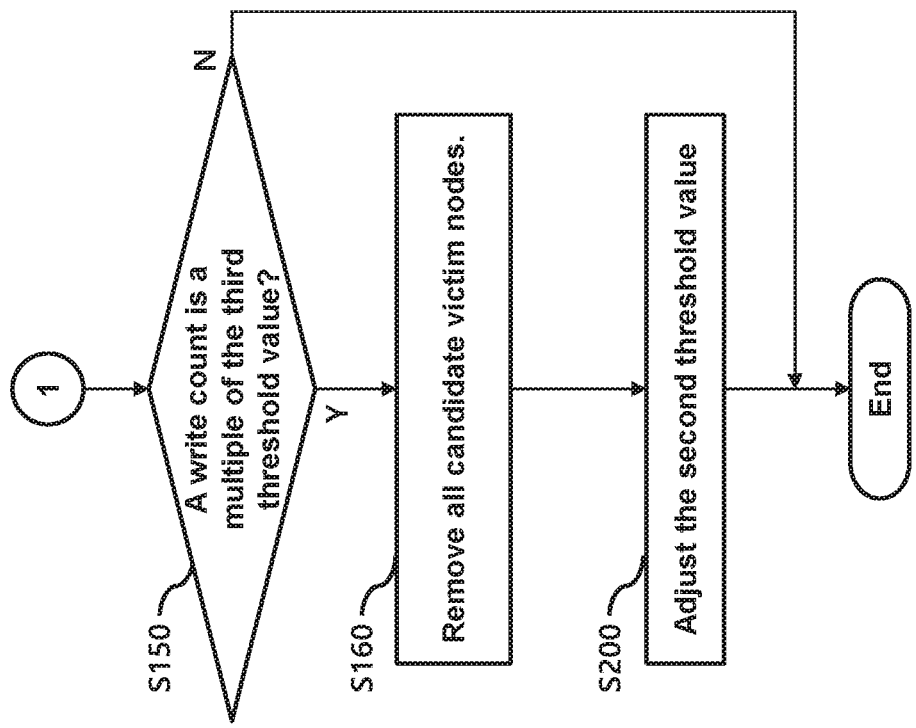

FIGS. 7 and 8 show a flow chart illustrating operations of a hot address detector 300 according to an embodiment of the present disclosure.

The operations of FIGS. 7 and 8 may be performed under the control of the detection controller 312.

In this embodiment, it is assumed that the operations indicated in FIGS. 7 and 8 are performed when the media controller 200 provides an interrupt signal.

A write address is inputted as operation S100 and a write count is increased as operation S110.

At this time, the write address refers to a logical address provided with an interrupt signal.

Then, it is determined whether a node stores an address the same as a write address as operation S120.

If there is a node containing a write address, which represents a hit, a hit count, a frequency count, and a period count are all increased at the corresponding node as operation S140.

Then, it is determined whether a hit count is greater than or equal to the first threshold value as operation S141.

A logical address of a node whose hit count is greater than or equal to the first threshold value is determined to be a hot address.

Accordingly, a hit count of the corresponding node is reset to 0 as operation S142, and a hot flag is activated as operation S143.

When the hot flag is activated, the wear level controller 400 receives a logical address, i.e., a hot address, determined by the hot address detector 300, and controls the wear leveling operation.

In this embodiment, the wear level controller 400 may select a physical address other than a physical address mapped to a current logical address, and provide the mapping table update signal to the mapping circuit 100.

At this time, the selected physical address may be a physical address corresponding to a logical address having a minimum write count.

If a hit does not occur at operation S120, a frequency count is decreased for all nodes as operation S130.

Then, it is determined whether a length of the list 321 is less than the initial value as operation S131.

If the length of a list is less than the initial value, a new node for storing an input logical address is added to the list and the length of a list is increased as operation S134.

At this time, a hit count, a frequency count, and a period count of the new node are set to 1 respectively.

If a length of the list 321 is greater than or equal to the initial value, it is determined whether a victim node exists as operation S132.

For this operation, the victim node represents a node whose frequency count is zero.

If a victim node exists, information for the victim node is updated with information on the newly input logical address as operation S136.

At this time, a hit count, a frequency count, and a period count of the node are set to 1 respectively.

If the victim node does not exist at operation S132, it is determined whether a length of the list is less than the maximum value as operation S133.

If the length of a list is less than the maximum value, the process proceeds to the operation S134 described above.

If the length of the list is greater than or equal to the maximum value, a node having a minimum frequency count is selected and updated with information on the newly input logical address as operation S135.

At this time, a hit count, a frequency count, and a period count of the node are initialized to 1, respectively.

After performing operation S134, S135, S136, or S143, the operations of FIG. 8 are performed.

The operations of FIG. 8 relate to determining whether the second threshold value should be adjusted.

First, it is determined whether a write count is a multiple of the third threshold value as operation S150.

If the write count is not a multiple of the third threshold value, the process is terminated.

If the write count is a multiple of the third threshold value, all candidate victim nodes are removed as operation S160.

At this time, the length of the list 321 should be greater than or equal to the minimum value.

The criterion for determining a candidate victim node may vary according to embodiment. In this embodiment, a candidate victim node is determined according whether a node has a frequency count which is 0 and whether a node has a hit count which is less than the second threshold value.

If a number of candidate victim nodes is large enough, some candidate victim nodes may remain in the list so that a length of the list 321 is greater than or equal to the minimum value.

In this case, a node having a relatively larger hit count may remain.

Thereafter, the second threshold value may be adjusted as operation S200.

As described above, the second threshold value is a variable used to control a length of the list 321. The second threshold value can be adjusted to variably control the length of the list 321.

FIGS. 9 to 14 show flow charts illustrating operations to adjust the second threshold value according to an embodiment of the present disclosure.

Figure 9:
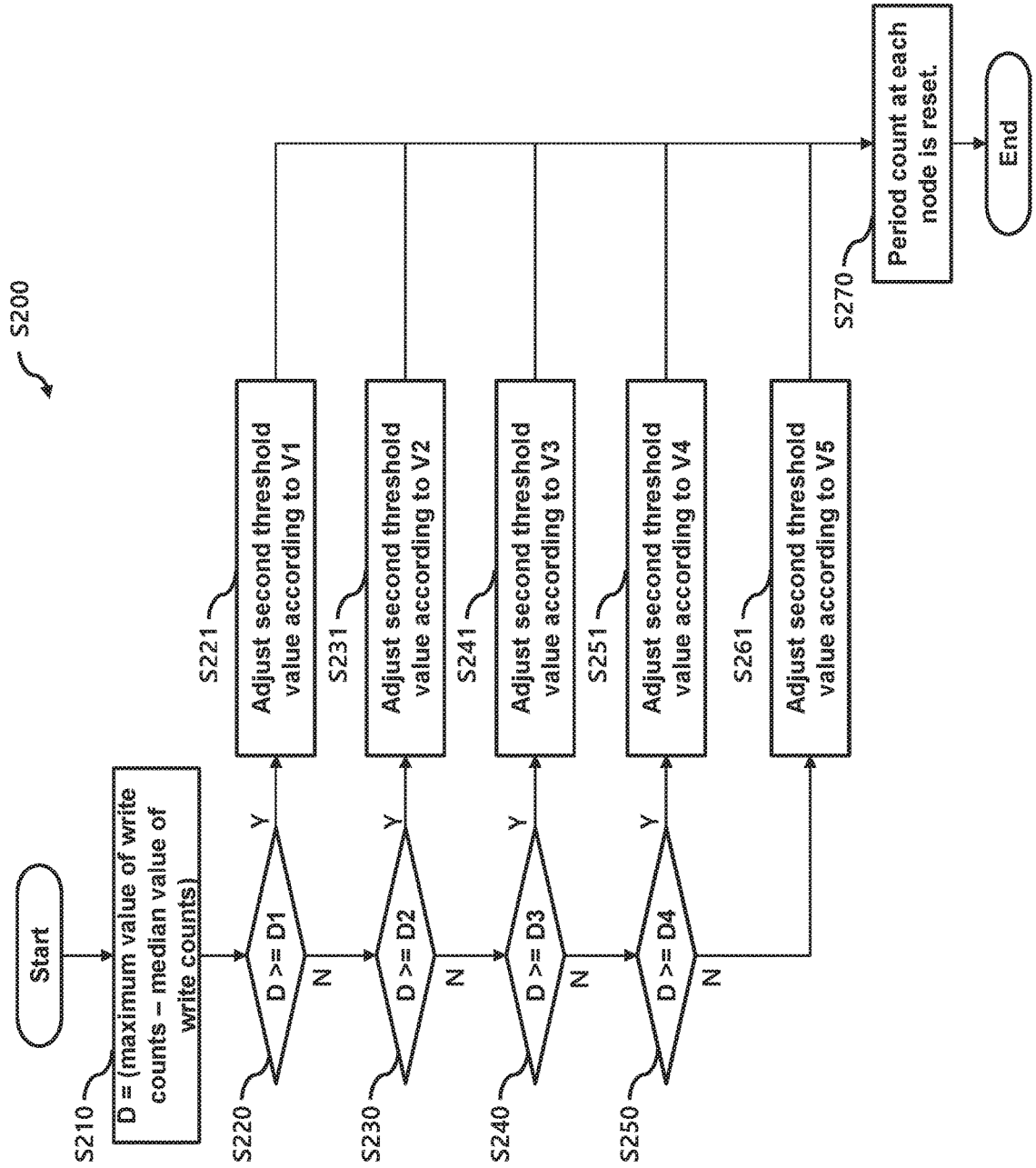
FIGS. 9 to 14 show flow charts illustrating operations to adjust a second threshold value according to embodiments of the present disclosure.

Referring to FIG. 9, the difference between a maximum value among the period counts of the list 321 and a median value among the period counts is set to D as operation S210.

As described above, a period count increases at a node where a hit occurs and remains constant at a node where a miss occurs.

The difference D can thus be used to determine a concentration of hits among nodes.

As D becomes larger, hit generations are concentrated on a specific node during a certain period.

In the present embodiment, the second threshold value is controlled according to the difference value D.

In the present embodiment, the first to fourth boundary values D1, D2, D3, and D4 where D1>D2>D3>D4, are used to distinguish an interval where the difference D belongs. Accordingly, the difference value D belongs to one of five intervals.

The number of intervals and the number of boundary values may vary with different embodiments.

The second threshold value is controlled to converge to a specific value according to the interval.

If the difference D is greater than or equal to the first boundary value D1 at operation S220, then the second threshold value is adjusted according to the first value V1 as operation S221.

If the difference D is less than the first boundary value D1 at step S220 and the difference D is greater than or equal to the second boundary value D2 at step S230, then the second threshold value is adjusted according to the second value V2 as operation S231.

If the difference D is less than the second boundary value D2 at step S230 and the difference D is greater than or equal to the third boundary value D3 at step S240, then the second threshold value is adjusted according to the third value V3 as operation S241.

If the difference D is less than the second boundary value D3 at step S240 and the difference D is greater than or equal to the fourth boundary value D4 at step S250, then the second threshold value is adjusted according to the fourth value V4 as operation S251.

If the difference D is less than the second boundary value D3 at step S240, then the second threshold value is adjusted according to the fifth value V5 as operation S261.

At this time, the first to fifth values V1, V2, V3, V4, and V5 may be variously set according to embodiment.

In the present embodiment, the first to fifth values have the relationship:

$$V1 \geq V2 \geq V3 \geq V4 \geq V5.$$

After adjusting the second threshold value, the period count is reset at all nodes as operation S270 and the process terminates thereafter.

Figure 10:
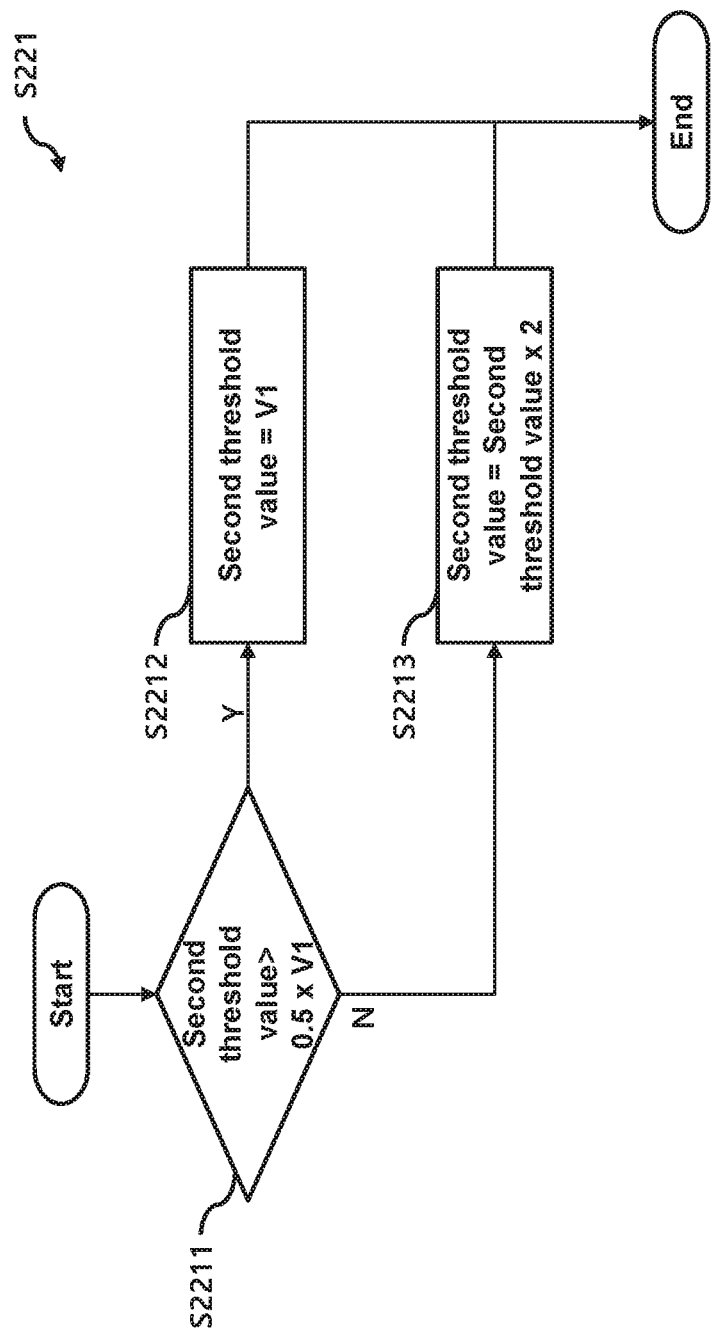

FIG. 10 shows a flow chart illustrating an example of the operation S221 of FIG. 9.

First, it is determined whether the second threshold value is larger than half of the first value V1 as operation S2211.

If the second threshold value is greater than half of the first value V1, then the second threshold value is set to the first value V1 as operation S2212 and if the second threshold value is not greater than half of the first value, then the second threshold value is set to twice the first value V1 as operation S2213.

Accordingly, the second threshold value in the corresponding interval is controlled to converge to the first value V1.

Figure 11:
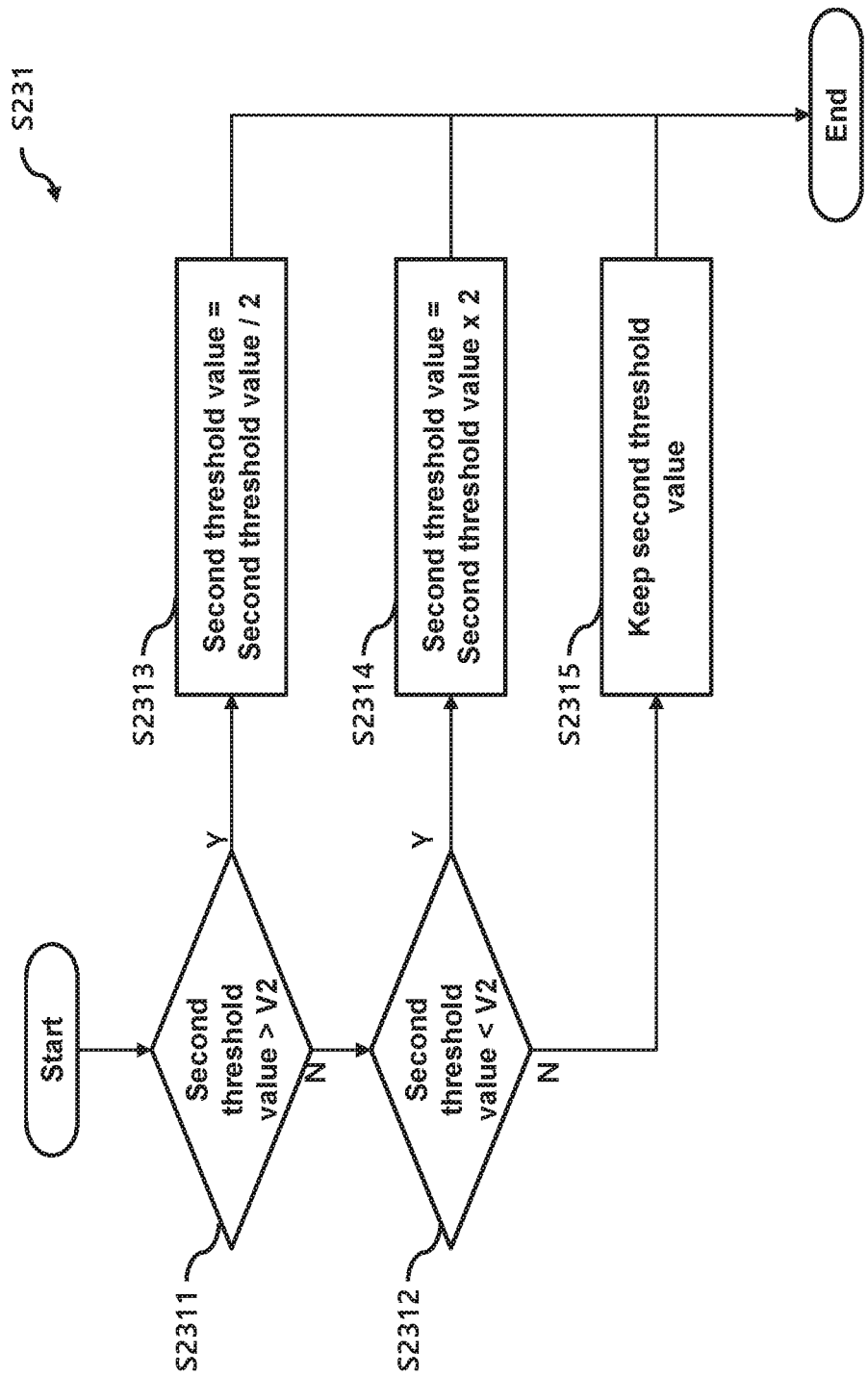

FIG. 11 shows a flowchart illustrating an example of the operation S231 of FIG. 9.

First, t is determined whether the second threshold value is to greater than the second value V2 as operation S2311.

If the second threshold value is greater than the second value V2, then the second threshold value is set to half of the second threshold value as operation S2313.

If the second threshold value is not greater than the second value V2 and if the second threshold value is less than the second value V2 for operation S2312, then the second threshold value is set to twice the second threshold value as operation S2314.

If the second threshold value is not less than the second value V2, then the second threshold value is kept as operation S2315.

Accordingly, the second threshold value in the corresponding interval is controlled to converge to the second value V2.

Figure 12:
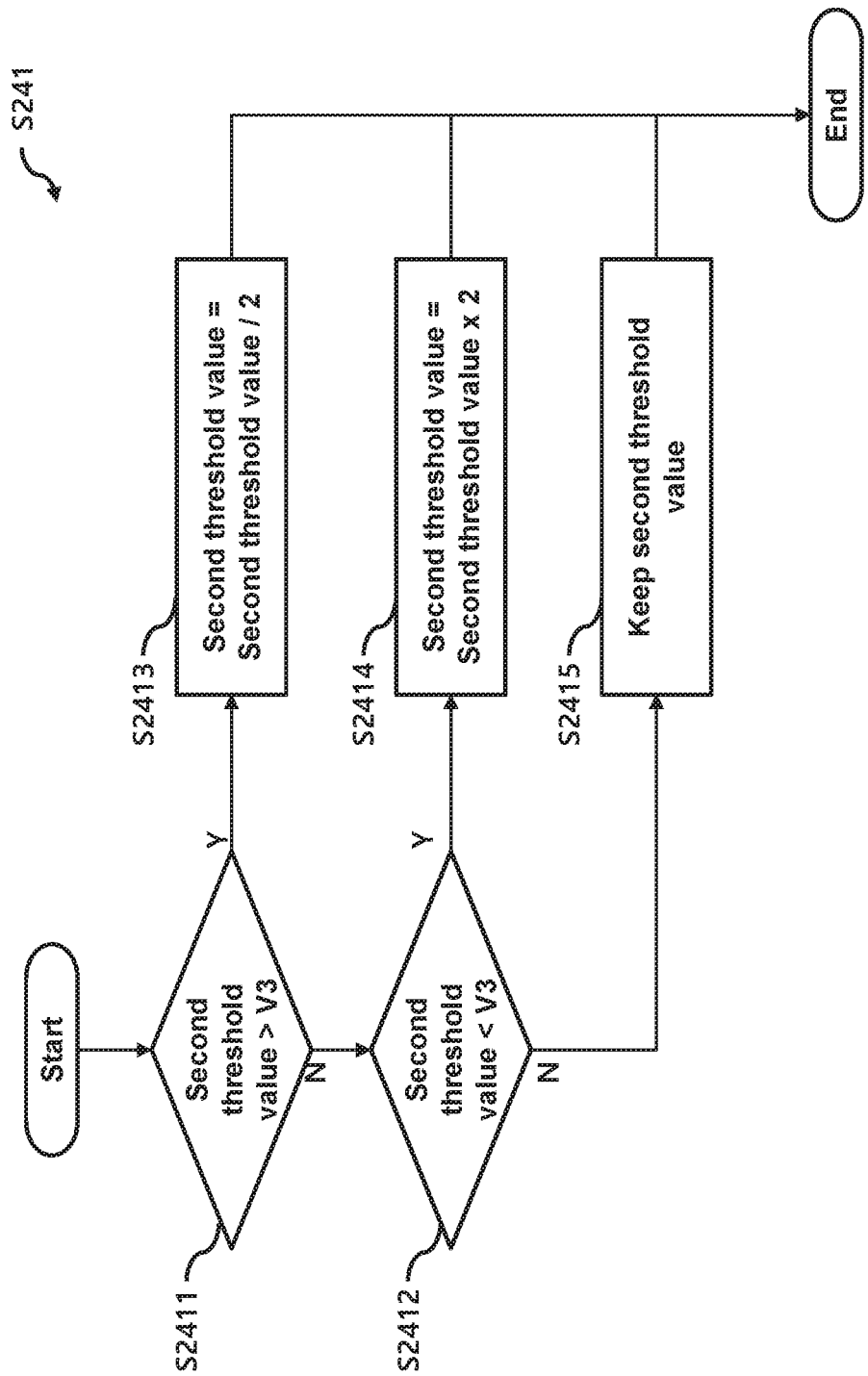

FIG. 12 shows a flowchart illustrating an example of the operation S241 of FIG. 9.

First, it is determined whether the second threshold value is greater than the third value V3 as operation S2411.

If the second threshold value is greater than the third value V3, then the second threshold value is set to half of the second threshold value as operation S2413.

If the second threshold value is not greater than the third value V3 and if the second threshold value is less than the third value V3 for operation S2412, then the second threshold value is set to twice the second threshold value at step S2414.

If the second threshold value is not less than the third value V3, the second threshold value is kept as operation S2415.

Accordingly, the second threshold value in the corresponding interval is controlled to converge to the third value V3.

Figure 13:
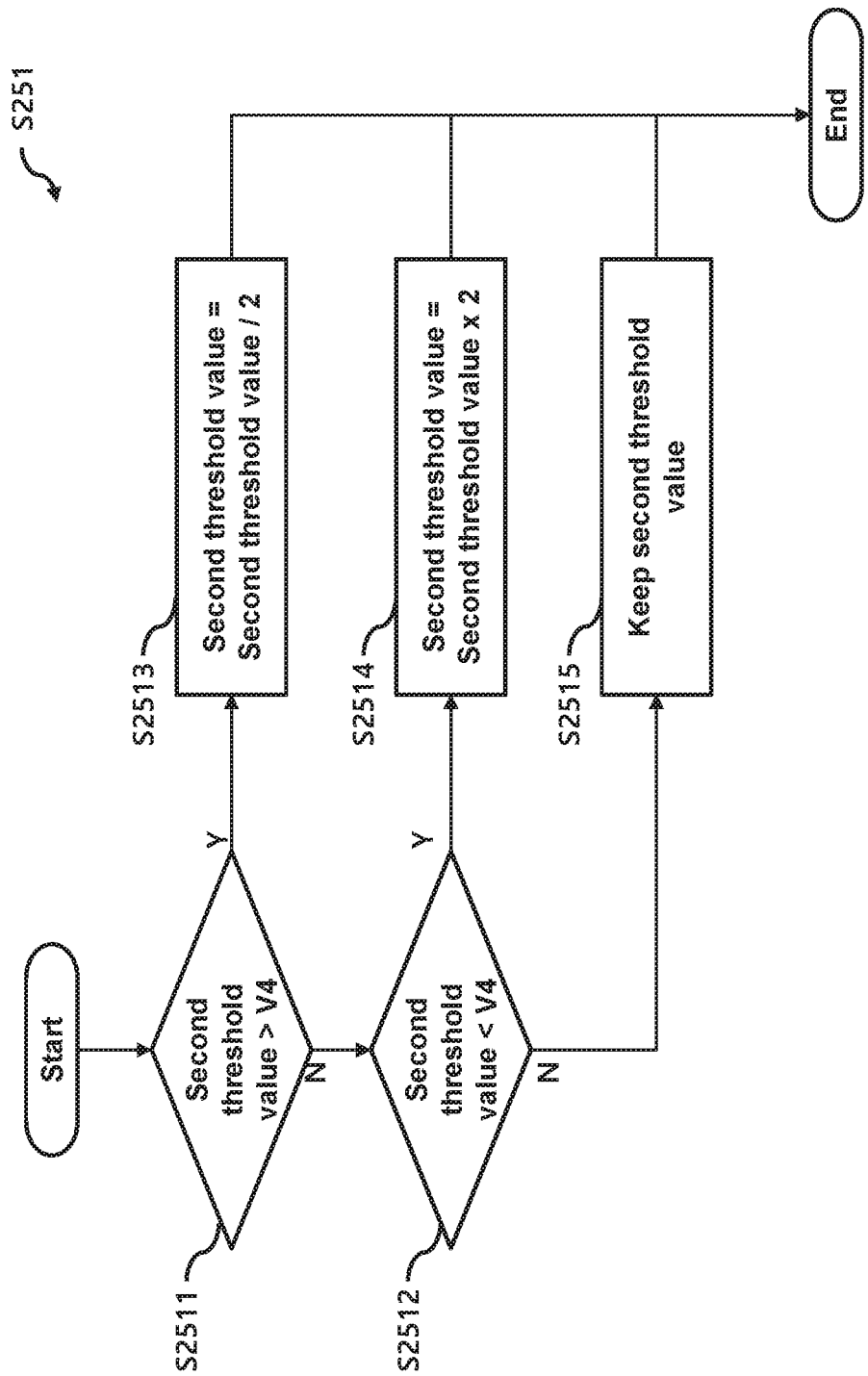

FIG. 13 shows a flowchart illustrating an example of the operation S251 of FIG. 9.

First, it is determined whether the second threshold value is greater than the fourth value V4 as operation S2511.

If the second threshold value is greater than the fourth value V4, then the second threshold value is set to half of the second threshold value as operation S2513.

If the second threshold value is not greater than the fourth value V4 and if the second threshold value is less than the fourth value V4 for operation S2512, then the second threshold value is set to twice the second threshold value as operation S2514.

If the second threshold value is not less than the fourth value V4, then the second threshold value is kept as operation S2515.

Accordingly, the second threshold value in the corresponding interval is controlled to converge to the fourth value V4.

Figure 14:
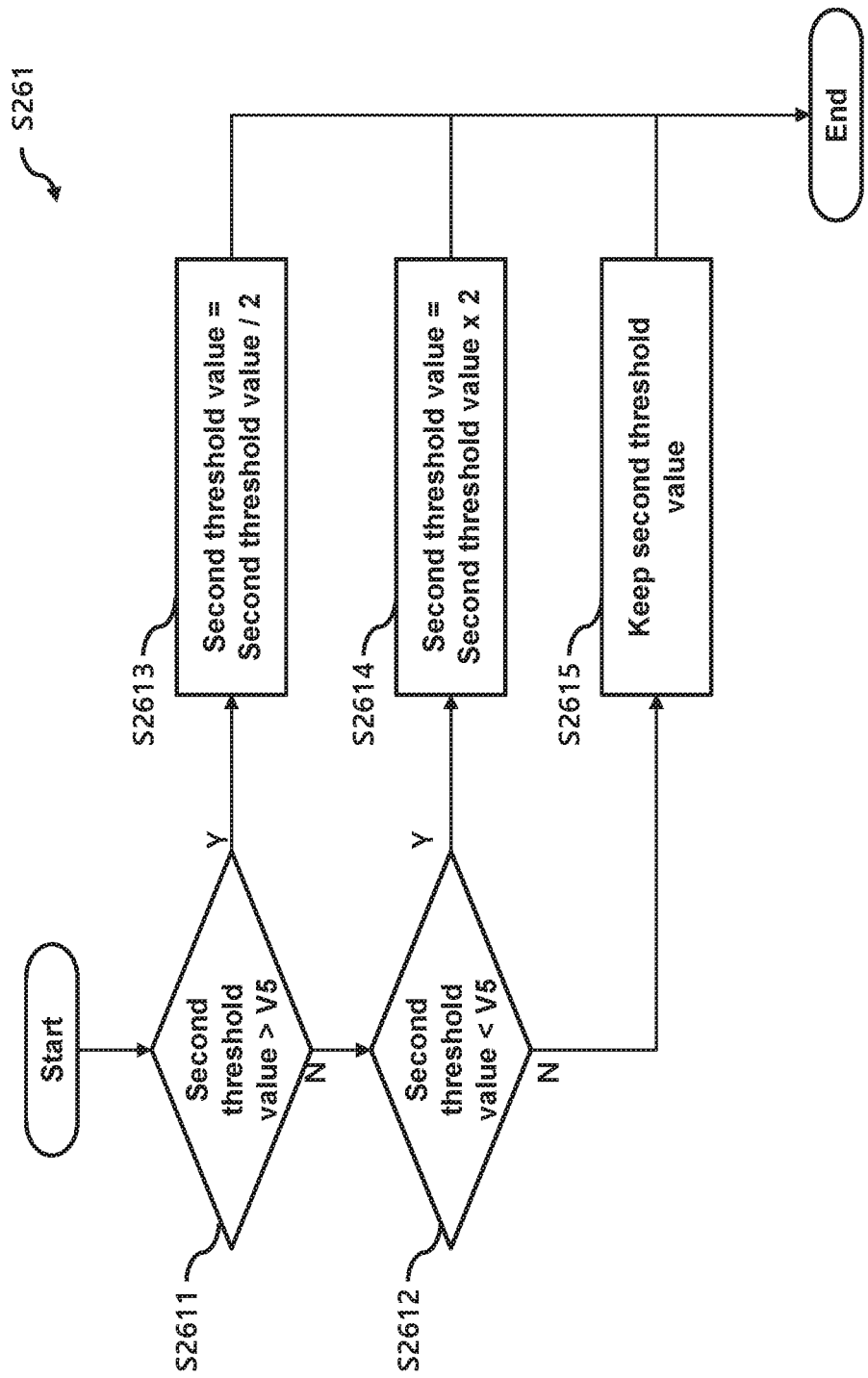

FIG. 14 shows a flowchart illustrating an example of the operation S261 of FIG. 9.

First, it is determined whether the second threshold value is greater than the fifth value V5 as operation S2611.

If the second threshold value is greater than the fifth value V5, then the second threshold value is set to half of the second threshold value as operation S2613.

If the second threshold value is not greater than the fifth value V5 and if the second threshold value is less than the fifth value V5 for operation S2612, then the second threshold value is set to twice of the second threshold value as operation S2614.

If the second threshold value is not less than the fifth value V5, then the second threshold value is kept as operation S2615.

Accordingly, the second threshold value in the corresponding interval is controlled to converge to the fifth value V5.

Figure 15:
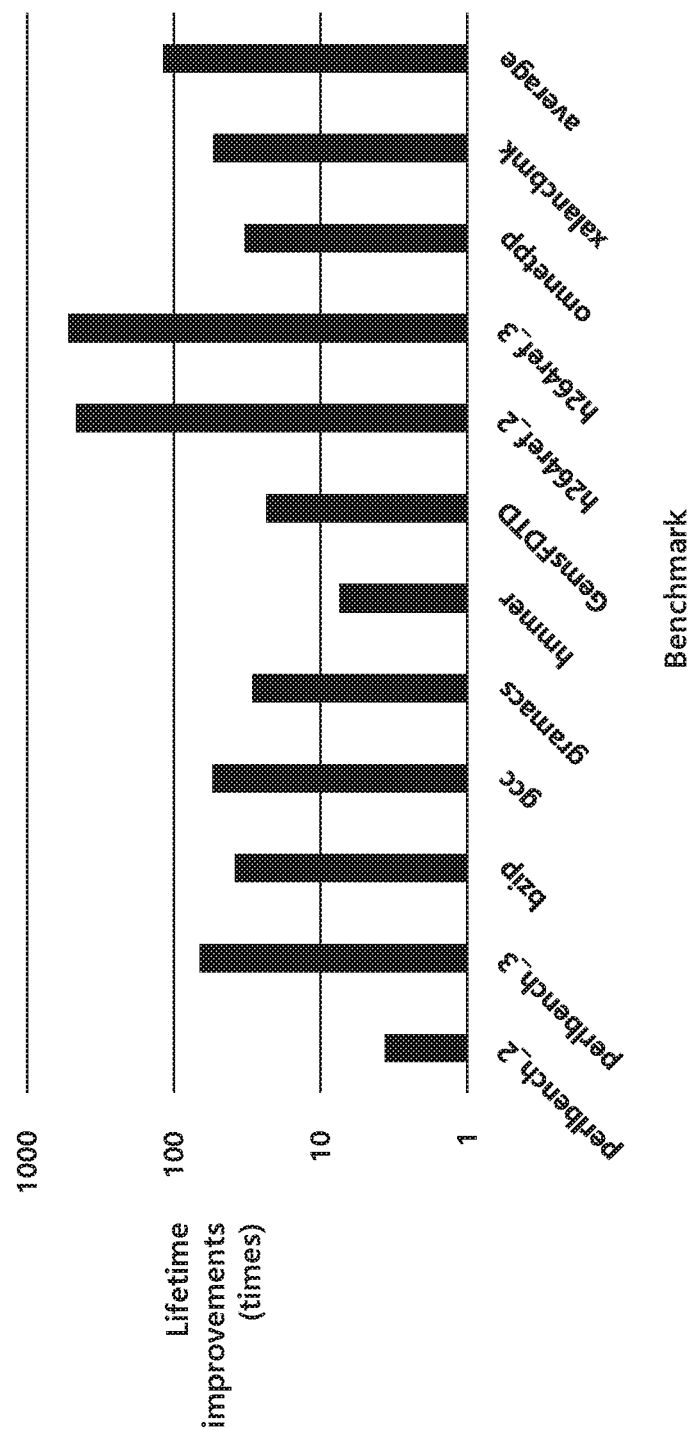
FIGS. 15 and 16 show bar graphs illustrating effects for embodiments of the present disclosure.
Figure 16:
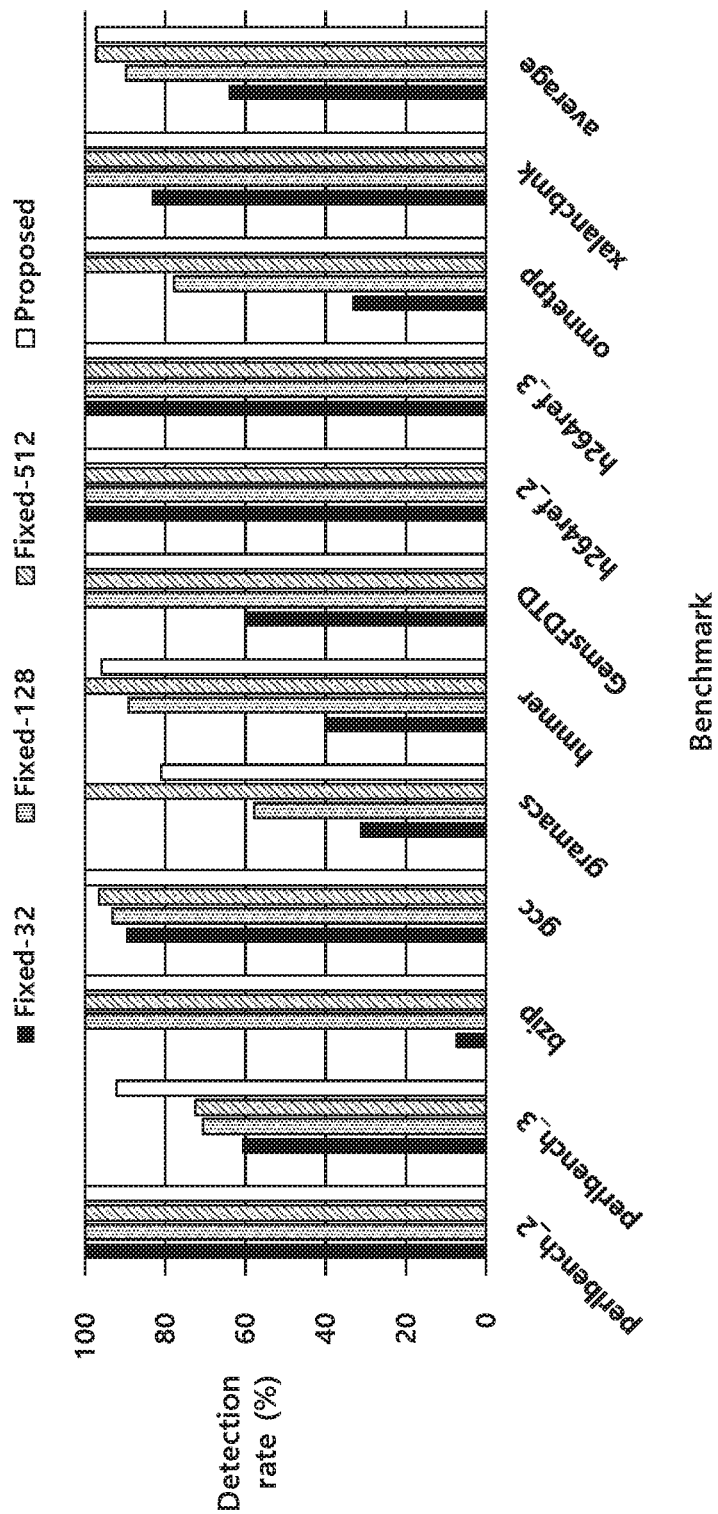

FIGS. 15 and 16 show bar graphs illustrating effects for embodiments of the present disclosure.

FIG. 15 shows a graph illustrating lifetime improvements for the nonvolatile memory device 20 when hot address detection and wear leveling techniques are applied relative to a case where these techniques are not performed.

The horizontal axis represents types of benchmarks and the vertical axis represents lifetime improvements for each benchmark.

As shown in the graph, when techniques according to the present disclosure are applied, the lifetime of a nonvolatile memory device increases at least five times and about 100 times on average.

FIG. 16 shows another graph illustrating effects of the presented techniques.

FIG. 16 compares hot address detection rates between cases where a length of the list 321 of the hot address detector 300 is fixed to a specific size and where a length of the list 321 is variably adjusted, as in the present disclosure.

In the graph, N of Fixed-N(N=32, 128, 512) represents a specific length of the list.

As shown in the graph, in most cases, the detection rate increases as N increases.

The detection rate of the present disclosure is similar or higher than a case where N is 512 on average.

This means the detection rate of the present disclosure using a list having a variable length is better than that of a case using a list having a largest length.

Since the remaining space of the memory stack 320 can be used for other purposes by variably controlling the length of the list, system resources may be used more efficiently while maintaining the hot address detection rate high enough in the present disclosure.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A semiconductor device comprising:
   a media controller configured to output an address in response to receiving a write request for writing to a nonvolatile memory; and
   a hot address detector configured to:
      store a list including the address output from the media controller and including meta data related to the address;
      update the meta data according to the address output from the media controller;
      determine whether the address output from the media controller is a hot address; and
      adjust a length of the list;
      wherein the hot address detector comprises: a memory stack configured to store the list; and a detecting circuit comprising a detection controller, wherein the detecting circuit is configured to detect a hot address from the list according to a first threshold value and to adjust a length of the list; wherein the detection controller is configured to adjust a length of the list based on a number of time the media controller provides the address; and wherein the detection controller is further configured to evict, from the list, a candidate victim node with a frequency count of zero and with a hit count of less than a second threshold value; and the semiconductor device further comprising a mapping circuit for storing a mapping table indicating a mapping relationship between a logical address and a physical address, wherein the mapping circuit comprises a counter array configured to store a write count corresponding to the address, the media controller is configured to update the write count according to the write request.

2. The semiconductor device of claim 1, wherein the media controller is configured to generate an interrupt signal when the write count is a multiple of a reference value.

3. The semiconductor device of claim 2, wherein the hot address detector is configured to operate in response to receiving the interrupt signal.

4. The semiconductor device of claim 1, wherein the detecting circuit further comprises a register for storing data used to detect the hot address and the length of the list.

5. The semiconductor device of claim 1, wherein the detection controller is configured to increase a hit count of a node when the address output by the media controller is stored in the node and is configured to determine the address stored in the node as a hot address when the hit count is greater than or equal to the first threshold value.

6. The semiconductor device of claim 1, wherein the detection controller is configured to decrease a frequency count of each node stored in the list when the address output by the media controller is not stored in the list and is configured to store the address output by the media controller in a new node or an existing node included in the list.

7. The semiconductor device of claim 6, wherein the existing node is selected among nodes in the list with a frequency count zero or with a minimum frequency count.

8. The semiconductor device of claim 6, wherein the new node is added to the list when the length of the list is less than an initial value or when a node with a frequency count of zero does not exist in the list and when the length of the list is maximum.

9. The semiconductor device of claim 1, wherein the detection controller is further configured to keep a number of nodes in the list greater than or equal to a minimum value.

10. The semiconductor device of claim 1, wherein the detection controller is further configured to adjust the second threshold value after evicting the candidate victim node from the list.

11. The semiconductor device of claim 10, wherein the detection controller is further configured to adjust the second threshold value according to a period count of a node, wherein the period count is increased when the address output from the media controller is stored in the node and the period count is kept same otherwise, and wherein the detection controller determines a difference value of write counts among nodes in the list and adjusts the second threshold value based on the difference value.

12. The semiconductor device of claim 11, wherein the difference value is a difference between a maximum value among write counts of nodes in the list and a median value among the write counts.

13. The semiconductor device of claim 2, further comprising a wear level controller configured to update information, related to the hot address, in the mapping table.

14. The semiconductor device of claim 13, wherein the wear level controller outputs a termination signal in response to an update operation being completed.

15. The semiconductor device of claim 1, wherein the address output from the media controller to the hot address detector is a logical address.

16. The semiconductor device of claim 15, wherein the logical address is a block address of a block including a plurality of pages.

* * * * *